June 10, 1930.  L. COX  1,762,652
PIPE DIE
Filed May 29, 1929  2 Sheets-Sheet 1
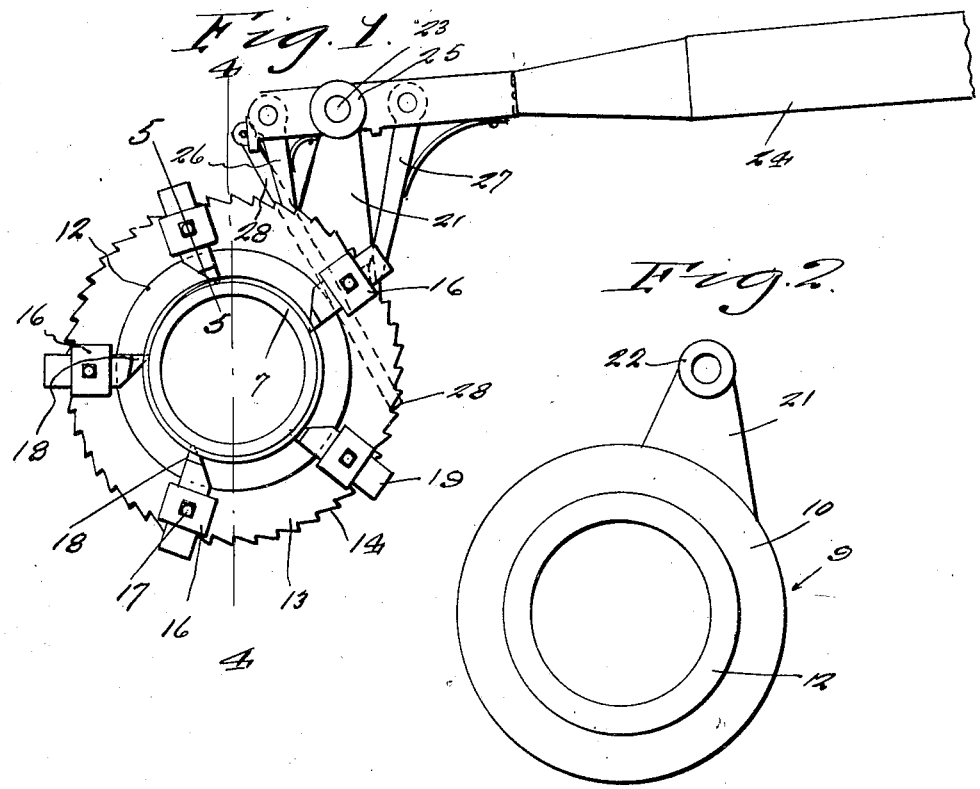
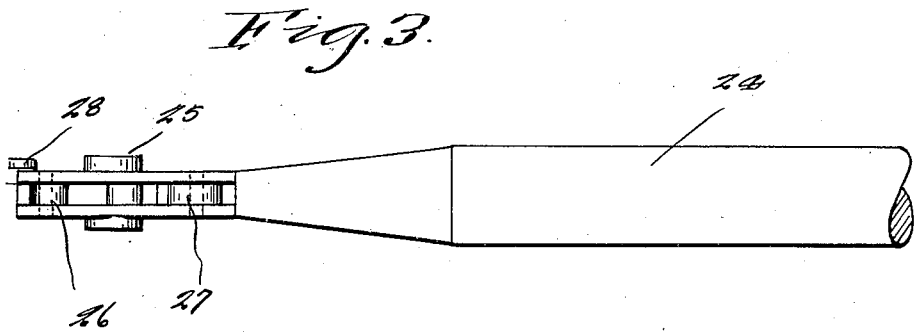
Inventor
Luther Cox.
By *Clarence A. O'Brien*
Attorney

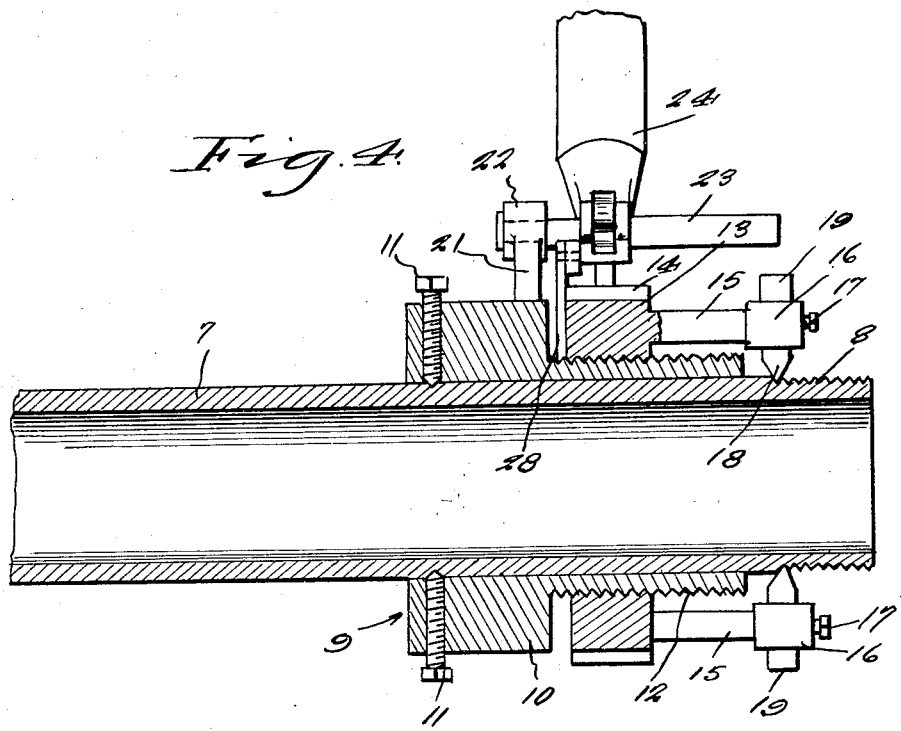
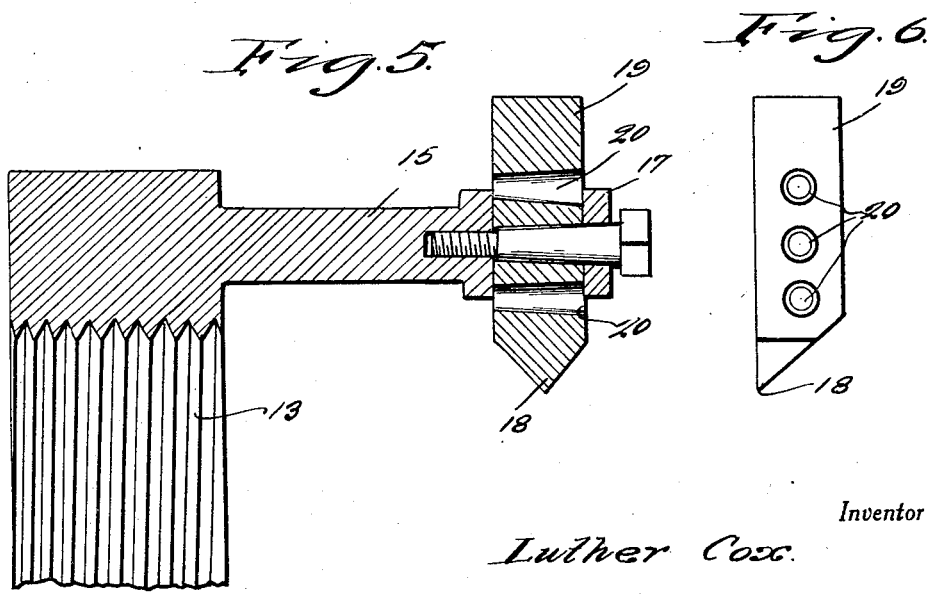

Patented June 10, 1930

1,762,652

UNITED STATES PATENT OFFICE

LUTHER COX, OF SMACKOVER, ARKANSAS

PIPE DIE

Application filed May 29, 1929. Serial No. 367,033.

This invention relates to an improved cutting tool which is generally referred to in the trade as a thread cutting die, and which is expressly intended in the present case for cutting threads on pipes and the like.

My principal aim is to generally improve upon tools of this class by providing one which is practical in design and construction, susceptible of expeditious attachment and use, accurate and dependable in action, and otherwise well fitted for fulfilling the requirements of a die of this class.

The particular details and their specific association and cooperation will become more readily apparent from the following description and drawings.

In the drawings wherein like reference characters are employed throughout the different views for distinguishing like parts:

Figure 1 is an end view of the tool in place on a pipe ready for operation.

Figure 2 is an end elevational view of that part of the tool hereinafter mentioned as the mounting.

Figure 3 is a plan view of the operating lever.

Figure 4 is a longitudinal sectional view taken approximately upon the plane of the line 4—4 of Figure 1.

Figure 5 is an exaggerated fragmentary sectional view taken on the line 5—5 of Figure 1.

Figure 6 is a detail view of a thread cutting tooth.

The complete construction may well be seen from Figure 4. In this figure the reference character 7 designates the pipe, the end of which is to be threaded as at 8. The principal part of the tool is designated as the mounting and generally indicated by the reference character 9. This comprises a collar 10 which surrounds the pipe at appropriate point and is fastened thereto by set screws 11. This collar is provided with a screw threaded sleeve 12 whose office is to feed the ring nut 13 back and forth. This ring nut in the present instance has its periphery equipped with ratchet teeth 14. Also the ring nut is provided with circumferentially outstanding arms 15 terminating in eyes 16 of the type seen in Figure 5. Each eye is threaded to accommodate an adjusting and retaining bolt 17 for the thread cutting tooth 18. The tooth includes the body portion having longitudinally spaced tapered holes for adjustable and selective reception of the bolt 17. This permits adjusting of the cutting teeth.

It will be observed that the collar 10 is provided with a laterally extending lug 21 having heads 22 with which the guide stem 23 is connected. This guide stem is disposed in spaced parallelism to the arms 15. The arms and guide stem of a length to permit them to project outwardly beyond the right hand end of the sleeve 12 as seen in Figure 4. Adapted to travel back and forth on this stem 23 is the operating lever 24. This as seen in Figure 1 is fulcrumed as at 25 on the stem and provided with alternately operable spring pressed pawls 26 and 27 which cooperate with the ratchet teeth on the ring nut 13. The reference character 28 designates a guide and follower arm which is pivoted on the pawl equipped end of the lever which rests against one side of the ring nut as seen in Figures 1 and 4.

When the device is on the pipe as seen in Figure 4 and the ring nut 13 placed at the right hand end of the sleeve 12 the cutting teeth will be at the extreme end of the pipe 7. Consequently by rocking the lever back and forth in an obvious manner the pawl and ratchet mechanism will serve to turn the ring nut on the screw threads on the sleeve 12, thus gradually feeding the ring nut inwardly. The cutting teeth will act on the pipe to produce threads 8.

Persons familiar with devices of this class will doubtless appreciate the novelty, utility and advantages. Therefore more lengthy description is regarded unnecessary.

Minor changes in shape, size, materials and rearrangement of details may be resorted to in actual practice if desired.

Having thus described the invention, what I claim as new and desire to secure by Letters Patent is:—

In a thread cutting die of the class described, a mounting including a collar having anchoring screws and a screw threaded feed sleeve, a nut threaded for operation on said sleeve provided with outstanding circumferentially spaced arms, cutting teeth adjustably mounted on the outer ends of said arms, a guide stem carried by the collar and projecting in spaced parallelism with said arms, an operating lever fulcrumed and slidably mounted on said stem, said nut being provided with ratchet teeth, and spring pressed alternatively operable pawls carried by said lever and cooperable with said ratchet teeth.

In testimony whereof I affix my signature.

LUTHER COX.